US011545160B2

(12) United States Patent
Jelacic et al.

(10) Patent No.: US 11,545,160 B2
(45) Date of Patent: Jan. 3, 2023

(54) METHOD, A COMPUTER PROGRAM, AN ENCODER AND A MONITORING DEVICE

(71) Applicant: Axis AB, Lund (SE)

(72) Inventors: Mersad Jelacic, Lund (SE); Marcus Tedenvall, Lund (SE); Markus Gerard, Lund (SE); Xing Danielsson Fan, Lund (SE); Ricard Wanderlöf, Lund (SE)

(73) Assignee: Axis AB, Lund (SE)

( * ) Notice: Subject to any disclaimer, the term of this patent is extended or adjusted under 35 U.S.C. 154(b) by 245 days.

(21) Appl. No.: 16/863,439

(22) Filed: Apr. 30, 2020

(65) Prior Publication Data

US 2020/0388290 A1  Dec. 10, 2020

(30) Foreign Application Priority Data

Jun. 10, 2019 (EP) ..................................... 19179214

(51) Int. Cl.
*G10L 19/02* (2013.01)
*G10L 19/002* (2013.01)
(Continued)

(52) U.S. Cl.
CPC ............ *G10L 19/002* (2013.01); *G06N 7/005* (2013.01); *G10L 19/02* (2013.01); *H04L 65/70* (2022.05); *H04L 65/75* (2022.05)

(58) Field of Classification Search
CPC ....... G10L 15/144; G10L 17/04; G10L 15/00; G10L 15/06; G10L 15/063; G10L 15/07;
(Continued)

(56) References Cited

U.S. PATENT DOCUMENTS 5,621,856 A  4/1997 Akagiri
5,742,734 A  4/1998 Dejaco et al.
(Continued)

FOREIGN PATENT DOCUMENTS

CN  101393741 A  3/2009
CN  102332267 A  1/2012

OTHER PUBLICATIONS

Li, Xiujuan. "Background-foreground information based bit allocation algorithm for surveillance video on high efficiency video coding (HEVC)." 2016 Visual Communications and Image Processing (VCIP). IEEE, 2016. (Year: 2016).*
(Continued)

*Primary Examiner* — Mark Villena
(74) *Attorney, Agent, or Firm* — Volpe Koenig

(57) ABSTRACT

A method, a computer program product, an encoder and a monitoring device for encoding an audio signal with variable bitrate, wherein: an audio signal comprising a plurality of successive audio frames is received; and for each successive audio frame of the audio signal: the audio frame is represented in a frequency domain with respect to a plurality of frequency sub-bands; the audio frame is classified in each frequency sub-band as either background or foreground using a background model specific to the frequency sub-band; each successive audio frame of the audio signal is encoded, wherein a number of bits is allocated for each frequency sub-band of the audio frame, wherein the number of bits allocated for a frequency sub-band is higher if the audio frame is classified as foreground in the frequency sub-band than if the audio frame is classified as background in the frequency sub-band.

20 Claims, 6 Drawing Sheets

(51) Int. Cl.
*G06N 7/00* (2006.01)
*H04L 65/70* (2022.01)
*H04L 65/75* (2022.01)

(58) Field of Classification Search
CPC ......... G10L 17/02; G10L 17/06; G10L 25/66; G06V 30/2276; G06V 30/36; G06V 40/30; G06V 10/147; G06V 10/94; G06V 20/13; G06V 20/54
See application file for complete search history.

(56) References Cited

U.S. PATENT DOCUMENTS

| | | | |
|---|---|---|---|
| 6,658,382 | B1 | 12/2003 | Iwakami et al. |
| 9,536,534 | B2* | 1/2017 | Kawashima ........ G10L 19/0208 |
| 2003/0009325 | A1 | 1/2003 | Kirchherr et al. |
| 2004/0083094 | A1* | 4/2004 | Zelazo ................ G10L 19/0216 |
| | | | 704/E19.021 |
| 2009/0281812 | A1 | 11/2009 | Jung et al. |
| 2012/0004918 | A1 | 1/2012 | Feng et al. |
| 2013/0018660 | A1 | 1/2013 | Qi et al. |
| 2013/0290003 | A1* | 10/2013 | Choo ................. G10L 21/0388 |
| | | | 704/500 |
| 2014/0188488 | A1* | 7/2014 | Schug ................. G10L 19/008 |
| | | | 704/500 |
| 2014/0236587 | A1 | 8/2014 | Subasingha et al. |
| 2015/0206541 | A1* | 7/2015 | Qi ......................... G10L 19/032 |
| | | | 704/229 |
| 2015/0302860 | A1 | 10/2015 | Qi et al. |
| 2015/0340044 | A1* | 11/2015 | Kim ..................... G10L 19/008 |
| | | | 381/23 |
| 2016/0064007 | A1 | 3/2016 | Villemoes et al. |
| 2017/0278519 | A1* | 9/2017 | Visser ..................... G01S 3/803 |
| 2018/0308494 | A1* | 10/2018 | Seroussi ............. G10L 19/0204 |
| 2019/0013028 | A1* | 1/2019 | Atti ....................... G10L 19/008 |
| 2019/0103118 | A1* | 4/2019 | Atti ....................... G10L 19/008 |

OTHER PUBLICATIONS

Thorogood, Miles, Jianyu Fan, and Philippe Pasquier. "Bf-classifier: Background/foreground classification and segmentation of soundscape recordings." Proceedings of the Audio Mostly 2015 on Interaction With Sound. 2015. 1-6. (Year: 2015).*

Chu, Selina, Shrikanth Narayanan, and C-C. Jay Kuo. "A semi-supervised learning approach to online audio background detection." 2009 IEEE International Conference on Acoustics, Speech and Signal Processing. IEEE, 2009. (Year: 2009).*

Extended European Search Report dated Dec. 20, 2019 for the European Patent Application No. 19179214.2.

Chinese Office Action dated Mar. 25, 2022 for Chinese Patent Application No. 202010506983.1.

* cited by examiner

METHOD, A COMPUTER PROGRAM, AN ENCODER AND A MONITORING DEVICE

TECHNICAL FIELD

The present invention relates, in general, to audio signal encoding, and more specifically to variable bitrate audio signal encoding.

BACKGROUND

An audio codec may encode audio data digitally and compress the resulting bit stream such that it may be efficiently stored or transmitted. After storage or transmission, the same audio codec may be used for decoding such that the audio may be recreated. Some audio codecs compress audio data using a constant bitrate (CBR), e.g. 256 Kbps. Other audio codecs support compressing audio data using a variable bitrate (VBR). With VBR encoding the bitrate of the encoded audio data may vary dynamically. For example, the bitrate may change depending on how many discrete frequencies the audio data contains, wherein few discrete frequencies require fewer bits than a complex signal. The bit rate may thus vary over time, e.g. between 65 Kbps and 320 Kbps. An advantage of VBR encoding is that it often produces less data than CBR encoding. Thus, storage space requirements may be reduced for stored audio data. In a similar fashion bandwidth requirements may be reduced for transferred audio data.

However, there is room for improvements in the field of audio encoding to further reduce the size of the output data.

SUMMARY

Providing an improved encoding of audio data, and reducing bandwidth requirements for transferred audio data and/or reduce storage space requirements for stored audio data would be beneficial.

According to a first aspect, there is provided a method for encoding an audio signal with variable bitrate, the method comprising:
receiving an audio signal to be encoded, the audio signal comprising a plurality of successive audio frames;
for each successive audio frame of the audio signal:
representing the audio frame in a frequency domain with respect to a plurality of frequency sub-bands;
classifying the audio frame in each frequency sub-band as either background or foreground using a background model specific to the frequency sub-band;
encoding each successive audio frame of the audio signal, wherein a number of bits is allocated for each frequency sub-band of the audio frame, wherein the number of bits allocated for a frequency sub-band is higher if the audio frame is classified as foreground in the frequency sub-band than if the audio frame is classified as background in the frequency sub-band.

It should be understood that the audio signal may be any type of audio signal, it may for instance be an audio signal recorded by a monitoring device such as a surveillance camera or a microphone. Each successive audio frame of the audio signal may have a duration, e.g. 20 ms, 60 ms, or 150 ms. The audio frames may be uncompressed or compressed.

It should also be understood that the audio frame may be represented in a frequency domain e.g. by performing a Fourier transform. This may e.g. be done using fast Fourier transform (FFT) or modified discrete cosine transform (MDCT). In the frequency domain a specific frequency sub-band of the audio frame may e.g. represent a sound, which occurs in the audio frame within that specific frequency sub-band, as a number of frequency components. The magnitude of a frequency component may represent the loudness of that frequency component in the audio frame. The plurality of frequency sub-bands may e.g. comprise 2, 3, 5, 8, 16 etc., frequency sub-bands. The spacing of the borders of the frequency sub-bands may or may not be equidistant. The frequency sub-bands may be logarithmically spaced where each sub-band is twice as wide as the former one. In one example there are 8 frequency sub-bands which are logarithmically spaced, the frequency sub-bands with the lowest frequency range may herein cover 20-40 Hz. In another example the lowest frequency range starts at 0 Hz.

It should also be understood that the background model may be configured to classify the frequency sub-band of the audio frame according to the importance of the sound that the frequency sub-band of the audio frame contains. Important sounds may herein be classified as foreground while unimportant sounds are classified as background. For example, if the frequency sub-band of the audio frame contains an important sound, the frequency sub-band of the audio frame may be classified as foreground. In another example the frequency sub-band of the audio frame is classified as background if it predominately contains unimportant sound. The importance of a sound may be determined based on how often this particular sound has been included in the frequency sub-band in previous audio frames.

It should also be understood that the background model may be configured to classify the frequency sub-band of the audio frame according to an expectation value for the sound that the frequency sub-band of the audio frame contains. Unexpected sounds may herein be classified as foreground while expected sounds are classified as background. For example, if the frequency sub-band of the audio frame contains an expected or common sound or no sound at all, the frequency sub-band of the audio frame may be classified as background. In another example, the frequency sub-band of the audio frame is classified as foreground if the content of the frequency sub-band does not match the requirements for a background classification.

It should also be understood that the background model conditions for classifying a frequency sub-band of the audio frame as foreground or background may vary from one frequency sub-band to another as the background model is specific to the frequency sub-band. For example, a monitoring device may monitor a workshop where either a first machine may be running or a first and a second machine may be running. Within a specific frequency sub-band a loudness at a first level may represent the first machine running and a loudness at a second level may represent the first and the second machine running. Thus, if the audio frame in that frequency sub-band displays a loudness which is at a low level, at the first level or at the second level the frequency sub-band of the audio frame may be classified as background. This may constitute unimportant or expected sounds. However, if the audio frame in that frequency sub-band displays a loudness which is between these levels or above these levels this may be classified as foreground. This may constitute important or unexpected sounds, e.g. speech superimposed on the sound of the first machine running, or that the machines are experiencing difficulties when running, leading to a different loudness in one or more sub-bands in an audio frame. In a different frequency sub-band the loudness levels may be chosen differently to reflect what should constitute foreground and background sounds within that frequency sub-band. The background model may also be specific to the frequency sub-band with regards to other features than the loudness level. For example, if the relative magnitude of the frequency components of a frequency sub-band of an audio frame corresponds to an unimportant or expected sound spectrum this may result in a background classification. In another example, the appearance of one or a few key frequency components within a certain frequency sub-band may trigger a foreground classification of that frequency sub-band in the audio frame. For example, sirens often use a tritone composed of three adjacent whole tones. The appearance of three corresponding frequency components may thus be seen as a spectral fingerprint which indicates that the siren has gone off and triggers a foreground classification.

Efficient encoding of an audio signal is facilitated by allocating a number of bits for each frequency sub-band of the audio frame such that frequency sub-bands where nothing important or unexpected is happening may be given/allocated few bits and thereby compressed to a high level. When the number of bits can be set individually for the different frequency sub-bands the total number of bits allocated to the entire audio frame may be small. In contrast, if the total number of bits is determined frame-wise, without distinguishing between different frequency sub-bands, a larger total number of bits may be needed.

It is a further realization that using a specific background model for each of the respective frequency sub-bands to determine their respective classification further facilitates efficient encoding of the audio signal as the bit allocation conditions may be customized for each frequency sub-band.

The present method facilitates reduced bandwidth requirements for transferred audio data and/or facilitates reduced storage space requirements for stored audio data.

The perceived quality of the decoded audio signal is high. The method may provide content-based compression wherein foreground sounds which may be of an important or unexpected character can be compressed less severely than background sounds which may be of an unimportant or expected character. The method may thus focus the given bandwidth or storage space resources on the parts of the audio signal where a high quality is most important, thereby providing a high perceived quality of the audio signal once it is decoded.

It should be understood that the encoding step may allocate bits to frequency spans of the audio signal wherein the frequency spans either are the same or different from the frequency sub-bands of the classifying step. In a first example two adjacent frequency spans in the encoding step correspond to one single frequency sub-band in the classifying step. In this case if the single frequency sub-band is classified as foreground both adjacent frequency spans may be given the same number of bits wherein the number of bits corresponds to the number of bits determined by the foreground classification of the single frequency sub-band. In a second example one single frequency span in the encoding step corresponds to two different frequency sub-bands in the classifying step. In this case a foreground classification of either of the frequency sub-bands or a foreground classification of both frequency sub-bands may result in the frequency span of the encoding step being given a number of bits corresponding to the number of bits determined by the foreground classification.

It should also be understood that if the frequency sub-bands of the classifying step and the frequency spans of the encoding step are different either the frequency sub-bands of the classifying step or the frequency spans of the encoding step may be decomposed. In the first example when the frequency sub-band is classified as foreground it may be decomposed and re-analyzed using decomposed frequency sub-bands that match the frequency spans of the encoding step. This may be done to determine which of the encoder frequency spans should be allocated a number of bits corresponding to a foreground classification. A reason for not using the same frequency sub-bands in the classifying step as in the encoder may be that a different frequency sub-band allocation gives better classification results. In the second example, if an encoder gives the possibility to decompose the frequency spans of the encoder step it may be possible to only allocate bits to a decomposed frequency span matching a foreground sub-band of the classifying step.

It should also be understood that the encoding step may allocate bits to audio frames wherein the audio frame duration of the encoding step either is the same or different from the audio frame duration of the classifying step. For example, the classification step may have an audio frame duration of 60 ms while the encoding step has an audio frame duration of 20 ms.

The number of bits allocated for encoding a background classified frequency sub-band of the audio frame may be dependent on a frequency range of the background classified frequency sub-band of the audio frame. Alternatively, or additionally, the number of bits allocated for encoding a foreground classified frequency sub-band of the audio frame may be dependent on a frequency range of the foreground classified frequency sub-band of the audio frame.

As an example, a frequency sub-band covering the frequency range of 20-40 Hz may be allocated 5 bits/sample if it is classified as foreground and 1 bit/sample if it is classified as background while the frequency range of 80-160 Hz may be allocated 7 bits/sample if it is classified as foreground and 2 bits/sample if it is classified as background.

Using a frequency dependency for the allocated number of bits facilitates an efficient encoding of the audio signal. More bits may e.g. be allocated to frequency sub-bands which are more important than others. For example, a frequency sub-band, where an important sound is expected to appear within a frequency range representing the frequency sub-band or representing part of the frequency sub-band, may be allocated a large number of bits when it is classified as foreground. The number of bits allocated may also depend on the size of the frequency range representing the frequency sub-band. For example, both the number of bits corresponding to a foreground and a background classification may be higher if the frequency range is large compared to if the frequency range is small.

A fixed total number of bits may be available for allocating to the different frequency sub-bands of an audio frame. The fixed total number of bits may be constant from one frame to a consecutive frame. In one example a minimum number of bits or zero bits may be allocated to frequency sub-bands with a background classification. The rest of the fixed total number of bits may be distributed among the remaining foreground classified frequency sub-bands.

The audio signal may be encoded such that the number of bits allocated to a background classified first frequency sub-band of a first audio frame is higher if the same first frequency sub-band in an audio frame preceding the first audio frame was classified as foreground compared to if the same first frequency sub-band in the audio frame preceding the first audio frame was classified as background.

As an example a frequency sub-band in a zeroth audio frame may be allocated 400 bits if it is classified as foreground and 50 bits if it is classified as background. If the frequency sub-band in the zeroth audio frame was classified as background and the same frequency sub-band in a subsequent first audio frame also is classified as background the same frequency sub-band in the first audio frame may also be allocated 50 bits. If instead the frequency sub-band in the zeroth audio frame was classified as foreground but the same frequency sub-band in a subsequent first audio frame is classified as background the same frequency sub-band in the first audio frame may be allocated e.g. 350 bits.

An advantage of having an allocated number of bits which depends not only on the classification of the frequency sub-band of the current audio frame but also on the classification of the frequency sub-band of a preceding audio frame may be that it facilitates robust encoding. The consequences of an erroneous background classification may be less severe if the classification of the frequency sub-band of a preceding audio frame is taken into account. It may be more likely that a background classification is erroneous when the preceding classification was foreground than when it was background. Thus, when a switch from a foreground classification to a background classification occurs the allocated bit number may be reduced gradually rather than instantaneously. This may reduce the loss of important audio components due to a high level of compression based on erroneous classification.

Additionally, the encoded audio signal is pleasant to listen to. Rapid changes in the compression level may produce signal artifacts in terms of errors in the perception of the recreated signal after decoding.

It should be understood that the allocated number of bits may not only depend on the classification of the immediately preceding audio frame. It may also depend on the classification of further preceding audio frames. For example, a background to foreground transition may trigger an immediate change in the allocated bit number from a low value to a high value while a foreground to background transition may trigger a gradual decrease of the allocated bit number. After the last foreground classification, the decrease of allocated bits may e.g. be the same for each new background classification until the low value is reached.

The number of bits allocated for encoding a frequency sub-band of the audio frame may further depend on a psychoacoustic model.

It should be understood that the psychoacoustic model may be a model of the human perception of sound.

The psychoacoustic model may e.g. reflect the limits of perception in terms of the sound loudness scale. The psychoacoustic model may herein e.g. be an equal-loudness contour representing e.g. a sound pressure as a function of frequency wherein different tones on the equal-loudness contour are perceived by the human ear to have the same loudness even though their sound pressures are different. The number of bits allocated for encoding a frequency sub-band of the audio frame may herein be higher if the frequency sub-band is close to the frequency where the human ear is most sensitive than if it is further away. The number of bits allocated for encoding a frequency sub-band of the audio frame may in this embodiment be higher if the frequency sub-band is close to the minimum of the equal-loudness contour than if it is further away. It should be understood that other scales reflecting the human ear's limits of perception in terms of the sound loudness scale may also be used.

The psychoacoustic model may e.g. reflect masking effects wherein if a human ear can detect a first frequency component of a certain magnitude depends on whether a second, different, frequency component is present or not. When the second frequency component is present the first frequency component may be masked and not detectable by the human ear. The number of bits allocated for encoding a frequency sub-band of the audio frame may according to this embodiment be lower if the content of the frequency sub-band is masked than if it is not masked.

Allocating the number of bits according to a psychoacoustic model may provide high quality compression. Parts of the audio signal which the human ear does not easily perceive may be compressed to a higher level than parts which the human ear is sensitive to.

The number of bits allocated for encoding a frequency sub-band of the audio frame may be dependent on the frequency range of the frequency sub-band of the audio frame according to a psychoacoustic model.

The psychoacoustic model may e.g. reflect the human ear's limits of perception in terms of the frequency scale. The psychoacoustic model may e.g. be the Bark scale which may is a non-linear frequency scale modelling the resolution of the human hearing system. One Bark distance on the Bark scale may herein equal the so called critical bandwidth that for some frequencies is logarithmically proportional to the frequency. The number of bits allocated for encoding a frequency sub-band of the audio frame may herein be proportional to the frequency range measured in Bark distances. It should be understood that other scales reflecting the human ear's limits of perception in terms of the frequency scale may also be used.

Allocating the number of bits based on the frequency range of the frequency sub-band of the audio frame according to a psychoacoustic model may provide high quality compression. More bits may be allocated to a frequency sub-band wherein the human ear has a high frequency resolution compared to a frequency sub-band wherein the human ear has a low frequency resolution.

The number of bits allocated for encoding a background classified frequency sub-band of the audio frame may be independent of a frequency range that the background classified frequency sub-band of the audio frame represents and the number of bits allocated for encoding a foreground classified frequency sub-band of the audio frame may be independent of a frequency range that the foreground classified frequency sub-band of the audio frame belongs to.

This embodiment may facilitate fast encoding. Allocating the same low number of bits to all background classified frequency sub-bands of the audio frame may e.g. be faster than determining how many bits that should be allocated for each background classified frequency sub-band individually. Furthermore, allocating the same high number of bits to all foreground classified frequency sub-bands of the audio frame may e.g. be faster than determining how many bits that should be allocated for each foreground classified frequency sub-band individually.

The method may also comprise:
for an audio frame of the audio signal:
for a frequency sub-band of the audio frame;
updating the background model specific to the frequency sub-band which corresponds to the frequency sub-band of the audio frame based on a frequency content of the frequency sub-band of the audio frame.

The frequency content may herein be a characteristic of the sound represented in the frequency sub-band. The frequency content may e.g. be the power spectral density (PSD)

of the entire frequency sub-band, a power spectral density measure within the frequency sub-band, the magnitude of a frequency component within the frequency sub-band, the magnitude of a plurality of frequency components within the frequency sub-band, a distribution of frequency components within the frequency sub-band, or an energy level of the frequency sub-band (sub-band energy of band b of frame x).

Updating the background model may facilitate further reduction of bandwidth requirements for transferring the encoded audio signal and/or reduction of storage space requirements for storing the encoded audio signal and/or improves the perceived quality of the audio signal after decoding.

Updating the background model may result in an adaptive background model which may change over time. The background model may thus adapt to changes in the environment during the recording of the audio signal. For example, when a new sound is introduced it may be classified as foreground such that many bits are allocated for the encoding of the new sound. However, if the sound keeps occurring in succeeding audio frames it may be likely that the sound is uninteresting. The model may then be updated such that the sound is identified as background in later audio frames. This may save resources as the sound may become compressed to a higher level.

Updating the background model may also save resources during deployment of the background model. If a static model is used it may need to be trained before it can accurately classify different sounds. Gathering and selecting training data may be costly either in terms of time or money. A background model which is updated based on the content of the frequency sub-bands it classifies may train itself. It may be deployed e.g. as a generic model and then adapt to the environment it is working in, thereby saving time and money.

The background model specific to the frequency sub-band may include a Gaussian Mixture Model, GMM, the GMM comprising a plurality of Gaussian distributions, each of which representing a probability distribution for energy levels in the frequency sub-band.

The energy level, or sub-band energy, may herein be a characteristic of the loudness of sound represented in the frequency sub-band. The energy level may e.g. be the PSD of the entire frequency sub-band, a PSD measure within the frequency sub-band, a wavelet energy of a sound in the frequency sub-band, the magnitude of a frequency component within the frequency sub-band, the summed magnitude of a plurality of frequency components within the frequency sub-band, or the summed magnitude of all the frequency components within the frequency sub-band. A Gaussian distribution may herein be represented e.g. by a mean value and a standard deviation, or a mean value and a variance. The Gaussian distribution may or may not be normalized, wherein a normalized Gaussian distribution has an integral equal to 1. The probability distribution represented by a Gaussian distribution may herein provide a probability of different possible outcomes of an energy level measurement in the frequency sub-band. The plurality of Gaussian distributions may e.g. consist of 3 to 6 Gaussian distributions, or 2 to 10 Gaussian distributions.

In an illustrative example each Gaussian distribution is a probability distribution for the PSD of the entire frequency sub-band for a certain sound. A first Gaussian distribution may e.g. represent a first background sound, e.g. the sound of a first machine running. If a PSD of the entire frequency sub-band of an audio frame has a value which is the same as the mean value of the first Gaussian distribution this may be taken as an indication of the content of the frequency sub-band of the audio frame being the sound of the first machine with a high probability. If the PSD of the entire frequency sub-band of an audio frame has a value that is slightly above or slightly below the mean value of the first Gaussian distribution this may indicate that the probability of the content of the frequency sub-band being the first sound is slightly lower. Thus the probability distribution may be a function that converts a measured energy level for a frequency sub-band to a probability that the frequency sub-band has a certain content, e.g. contains the sound of the first machine. A high probability of the content being a background sound may in turn indicate that a background classification of the frequency sub-band may be warranted. However, it should be understood that there may also be other indications determining the classification.

Using such a background model may be an efficient way of identifying the content of a frequency sub-band. The processing power required for the classification may thus be low.

Such a background model is also an accurate way of identifying the content of a frequency sub-band. The probability distributions may e.g. be continuous functions which may be a more accurate way of determining the content compared to e.g. merely comparing a measured energy level to a threshold. By using a plurality of Gaussian distributions, multiple background models representing different content of the frequency sub-band may be included. The mixture of the Gaussian distributions may thus represent a complex probability distribution which may describe e.g. the probability of the content of the frequency sub-band being either one of several different sounds.

Such a background model may also be an efficient way to implement an adaptive model. A frequency sub-band of an audio frame may be seen as a sample which builds statistics of how common different sounds are in that frequency sub-band. For example, if a measured PSD value is slightly below the mean value of a Gaussian distribution specific to a certain frequency sub-band the mean value for that Gaussian distribution may be slightly reduced for the following audio frame.

A frequency sub-band of the audio frame may be classified as background if an energy level of the frequency sub-band of the audio frame lies within a predetermined number of standard deviations around a mean of one of the Gaussian distributions of the GMM of the background model specific to the frequency sub-band, and if a weight of said Gaussian distribution is above a threshold, wherein the weight represents a probability that an energy level of the frequency sub-band of the audio frame will be within the predetermined number of standard deviations around the mean of said Gaussian distribution.

The predetermined number of standard deviations may be any suitable number, e.g. 2, 2.5 or 3 standard deviations.

An advantage of this embodiment may be that it facilitates a high accuracy in the classification of the frequency sub-bands. Various sounds may herein be classified accurately despite of the sounds varying e.g. over time. For example, the loudness of a certain background sound may vary. The background sound may e.g. be a murmur of people working in the background of a room. The loudness of that background sound may then vary depending on the number of people. It may herein be desirable to classify the murmur as background when the loudness is within a certain range. The expected range of the loudness level may then be defined by the Gaussian distribution in terms of mean and standard deviation. If an energy level of the frequency sub-band of the audio frame lies within the predetermined number of standard deviations around the mean this may indicate that the content of the frequency sub-band possibly is background sound. However, this may not be enough to trigger a background classification. The background model represented by that Gaussian distribution may e.g. be uncertain. The Gaussian distribution may therefore have a weight that accounts for the uncertainty. How restrictive the background model should be in indicating that the content of the frequency sub-band possibly is a certain background sound may then be regulated by the predetermined number of standard deviations. Whether an indication that the content of the frequency sub-band possibly is a certain background sound should result in a background classification may then be regulated by the weight. When updating the background model, a measured PSD value being within a predetermined number of standard deviations around a mean of a first Gaussian distribution may increase the weight of the first Gaussian distribution, for example by a predetermined value. Alternatively, or additionally, the weight of the remaining Gaussian distributions of the GMM may be reduced by a predetermined value.

The energy level may be a power spectral density, PSD, measurement.

The PSD may herein represent how power is distributed among frequency components of the audio signal. The PSD may be measured using e.g. the Yule-Walker auto regressive method or Bartlett's method. The PSD may e.g. be a PSD measure of the entire frequency sub-band, or a PSD measure within the frequency sub-band, e.g. for one frequency component or a number of frequency components within the frequency sub-band.

An advantage of using such a definition of the energy level is that it facilitates a high accuracy in the classification of the frequency sub-bands. A PSD value may be an accurate representation of loudness. Furthermore, calculating a PSD value from a Fourier transform may be computationally easy. The computational power needed for the classification may thereby be low.

The method may further comprise:
transmitting the encoded audio frames of the audio signal together with metadata, wherein the metadata represents the classification of the frequency sub-bands of the audio frames.

transmitting the metadata with the encoded audio frames facilitate efficient decoding. For example, different methods may be used to decode foreground and background frequency sub-bands. If the classification of the frequency sub-bands is marked using metadata which method should be applied to which frequency sub-band may be easily determined. This may save processing resources.

The encoding of the audio signal may be performed by an Opus audio codec.

The Opus audio codec may internally determine the allocation of bits to the different frequency sub-bands which are encoded by the encoder. For example, in Opus the mechanism named the maximum allocation vector may be used for this purpose. The allocation of bits may be modified to reduce the number of bits in frequency bands which have been deemed as background at the expense of bits in frequency bands which have been deemed as foreground. It should be understood that codecs other than Opus may also be used.

According to a second aspect of the present concept there is provided a computer program product comprising a computer-readable medium storing computer-readable instructions which, when executed on a processing unit, will cause the processing unit to perform the method according to any one of the preceding claims.

Effects and features of this second aspect are generally analogous to those described above in connection with the first aspect. Embodiments mentioned in relation to the first aspect are generally compatible with the second aspect.

Such a computer program product may thus provide a possibility to install and execute the program in order to obtain the above-discussed advantages of the method.

According to a third aspect of the present concept there is provided an encoder for encoding an audio signal with variable bitrate, the encoder comprising a receiver and one or more processors, wherein the receiver is configured to receive an audio signal to be encoded, the audio signal comprising a plurality of successive audio frames, and;

wherein the one or more processors are configured to:
for each successive audio frame of the audio signal:
represent the audio frame in a frequency domain with respect to a plurality of frequency sub-bands;
classify the audio frame in each frequency sub-band as either background or foreground using a background model specific to the frequency sub-band;
encode each successive audio frame of the audio signal, wherein a number of bits is allocated for each frequency sub-band of the audio frame, wherein the number of bits allocated for a frequency sub-band is higher if the audio frame is classified as foreground in the frequency sub-band than if the audio frame is classified as background in the frequency sub-band.

Effects and features of this third aspect are generally analogous to those described above in connection with the first aspect. Embodiments mentioned in relation to the first aspect are generally compatible with the third aspect.

It should be understood that the encoder may be physically connected to a device recording the audio signal. However, it should also be understood that the encoder may be wirelessly connected to the device recording the audio signal, the encoder may e.g. be situated in a server wherein the server communicates with the device recording the audio signal.

According to a fourth aspect of the present concept there is provided a monitoring device comprising:
a microphone configured to record an audio signal;
an encoder according to the third aspect configured to receive the audio signal from the microphone and encode the audio signal with variable bitrate.

Effects and features of this fourth aspect are generally analogous to those described above in connection with the first aspect. Embodiments mentioned in relation to the first aspect are generally compatible with the fourth aspect.

An advantage of combining a microphone and an encoder is that the monitoring device can operate with a large degree of autonomy. For example, the monitoring device may transmit an encoded audio signal onto a network without the support of other devices or servers.

BRIEF DESCRIPTION OF THE DRAWINGS

The above, as well as additional objects, features and advantages of the present concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description is set for hereinafter according to a preferable embodiment, being not used to limit the claimed scope. This may be embodied in many different forms and should not be construed as limited to the embodiments set forth herein; rather, these embodiments are provided for thoroughness and completeness, and fully convey the scope of the concept to the skilled person.

Figure 1:
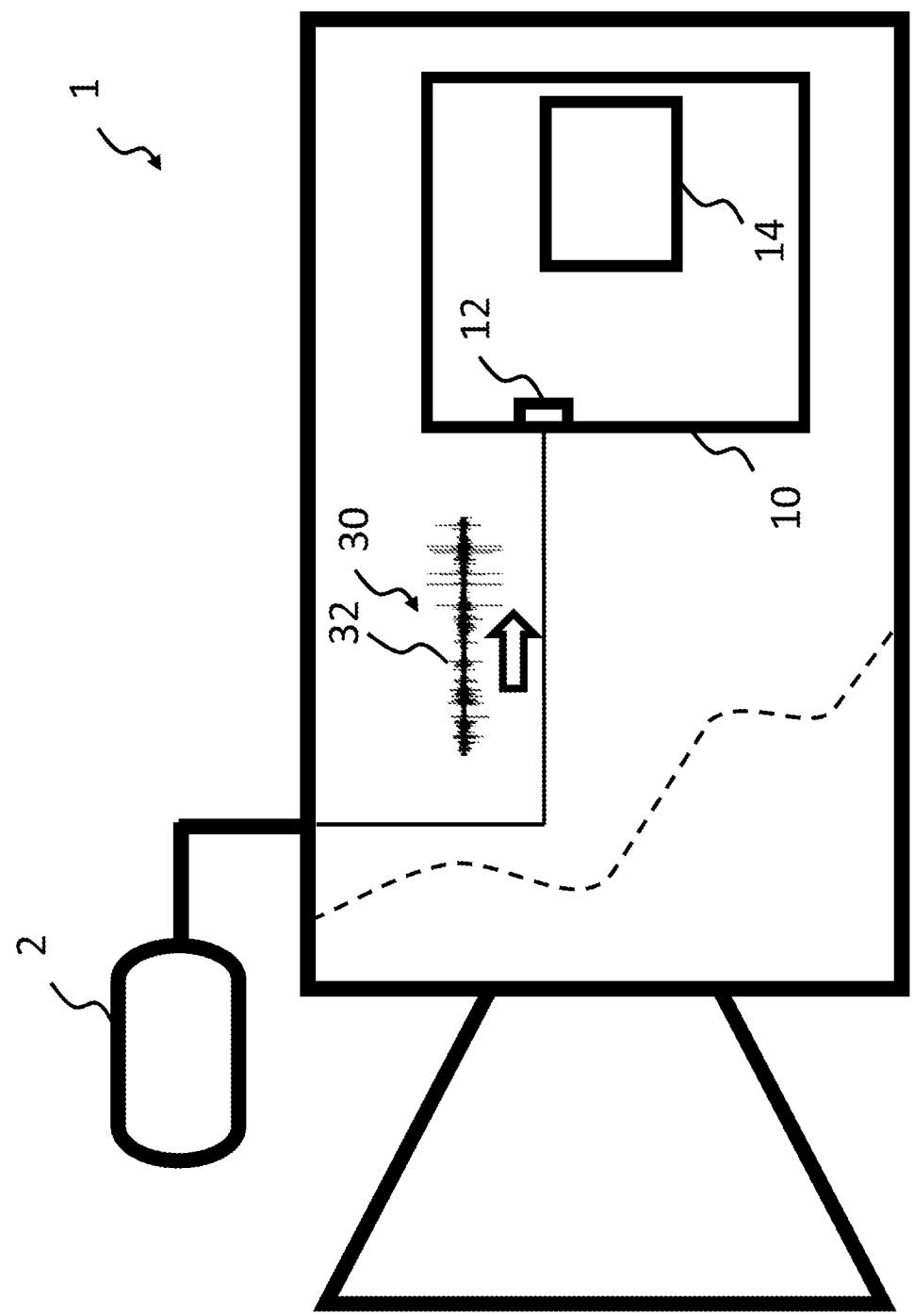
FIG. 1 is an illustrations of an encoder in a monitoring device.
Figure 2:
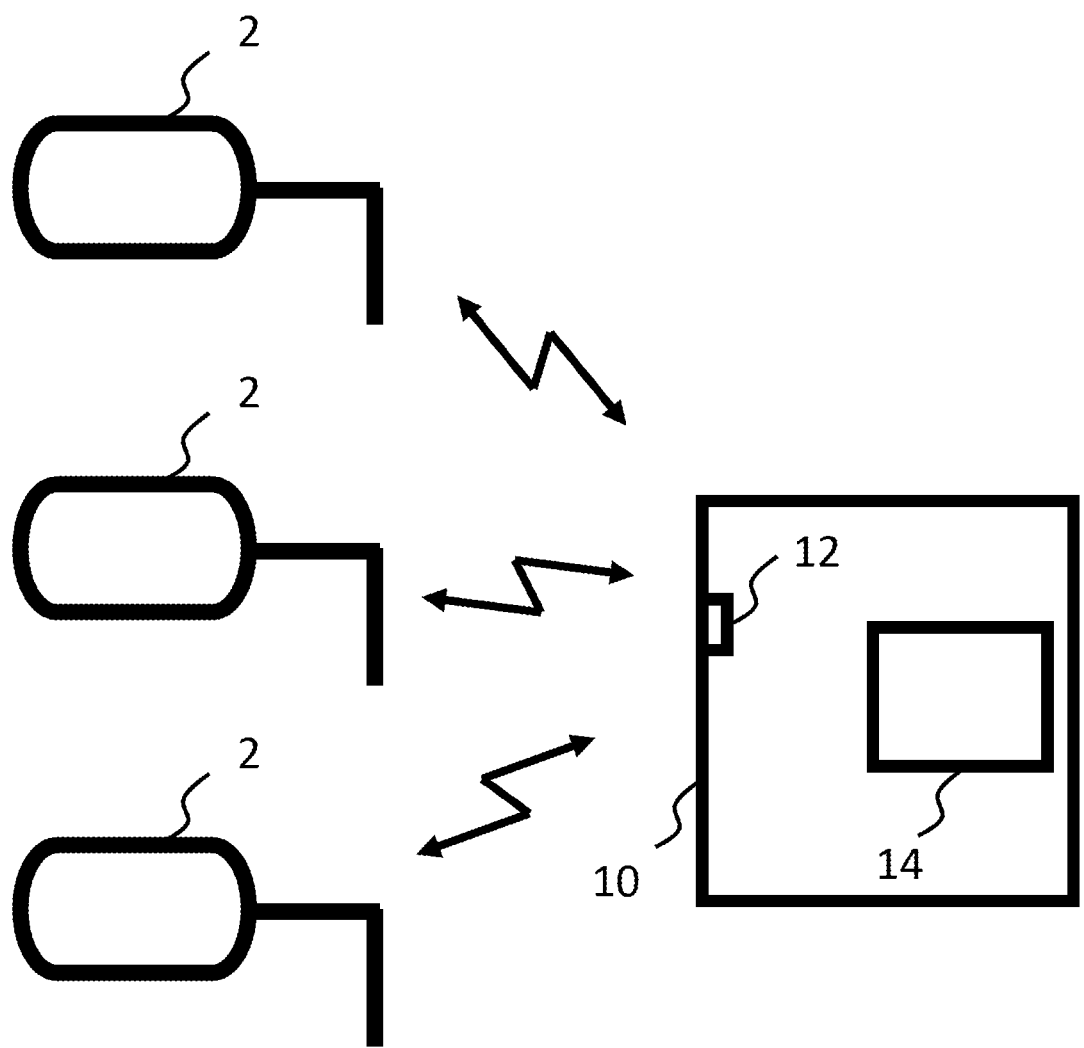
FIG. 2 is an illustrations of an encoder wirelessly connected to microphones.

FIG. 1 and FIG. 2 are schematic illustrations of an encoder 10 comprising a receiver 12 and a processor 14. In FIG. 1 the encoder 10 is situated in a monitoring device 1 which further comprises a microphone 2 configured to record an audio signal 30 which is passed to the receiver 12. The monitoring device 1 may or may not be capable of additionally recording a video signal. In FIG. 2 the encoder 10 supports several microphones 2. The encoder 10 may thus be part of a stand-alone monitoring device or part of a central support unit, e.g. a network video recorder or a network audio recorder.

The encoder 10 receives the audio signal 30, e.g. from the microphone 2, and encodes the audio signal 30 by processing the signal using the processor 14. The encoded audio signal may then be transmitted, e.g. over a local area network. The encoded audio signal may also be stored either locally on the monitoring device 1 or on a remote storage media.

The audio signal 30 passed from the microphone 2 to the encoder 10 may be an analog or digital representation of sound waves impinging on the microphone 2. The received audio signal 30 comprises a plurality of successive audio frames 32. Each successive audio frame 32 of the audio signal 30 may represent a time segment of the audio signal of a certain duration, e.g. 60 ms. The audio frames 32 may be explicitly defined, e.g. by each time segment being represented by a bit string. The audio frames 32 may also be implicitly defined, e.g. by a frame clock defining the start of each audio frame 32. The audio frames 32 may be uncompressed. However, the audio frames 32 may also be compressed. The audio signal 30 may e.g. have been pre-compressed and the encoder 10 may then add a further compression.

FIG. 1 illustrates a wired connection between the microphone 2 and the encoder 10 through which the audio signal 30 is passed to the encoder 10. FIG. 2 illustrates a wireless connection between the encoder 10 and microphones 2.

Figure 3:
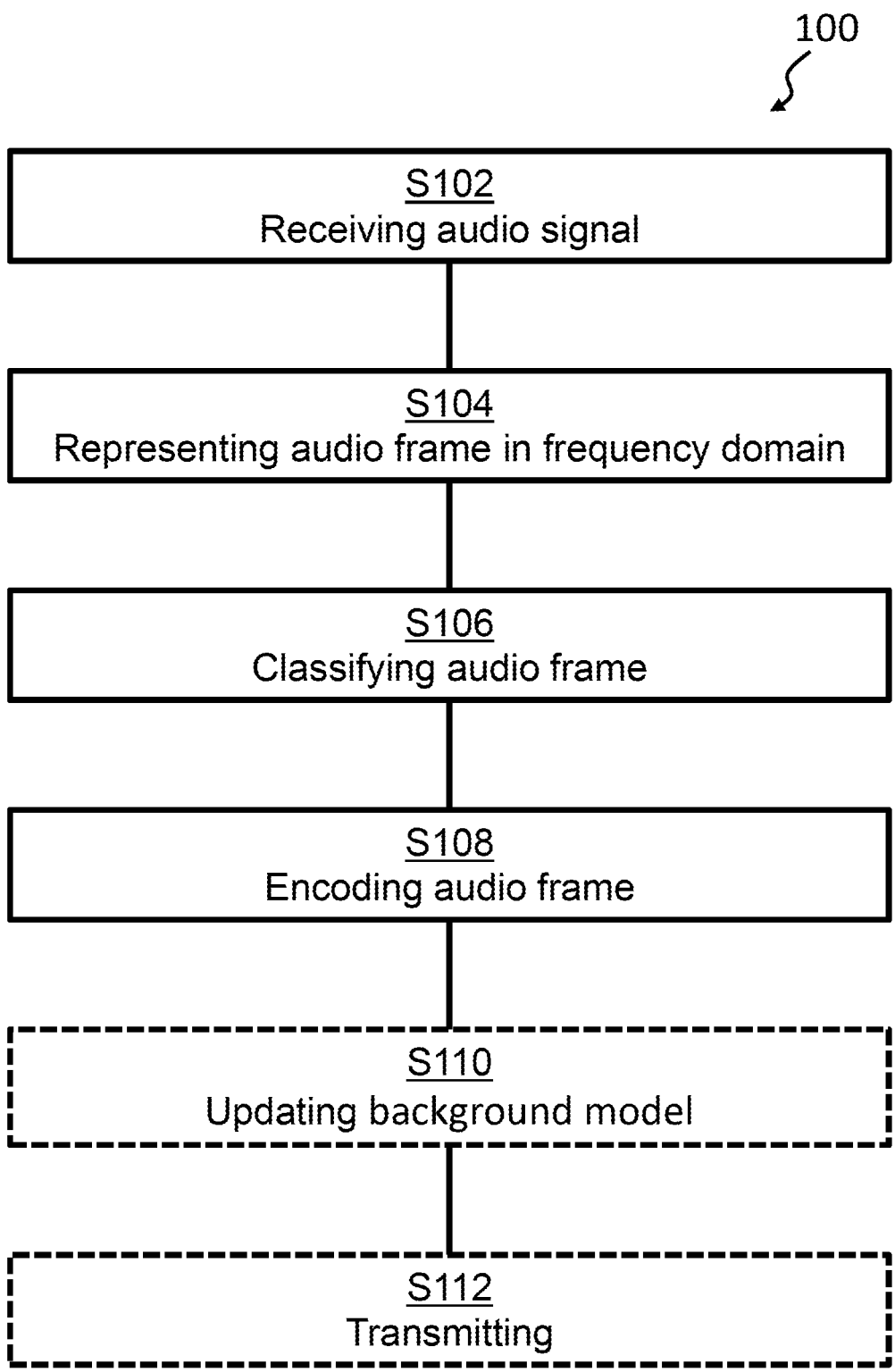
FIG. 3 is a flow chart of a method for encoding an audio signal with variable bit rate.

FIG. 3 shows a flow chart illustrating a method 100 for encoding an audio signal 30 with variable bit rate. The method 100 may e.g. be used by the encoder 10 to encode the audio signal 30 with variable bit rate. It should be understood that FIG. 3 does not define a particular order for the steps of the method 100.

According to the method 100 the audio signal 30 is received S102, the audio signal 30 comprising a plurality of successive audio frames 32.

Each successive audio frame 32 is then represented S104 in the frequency domain with respect to a plurality of frequency sub-bands 34 (see further below in conjunction with FIG. 4). This may e.g. be done using fast Fourier transform (FFT) or modified discrete cosine transform (MDCT). Once an audio frame 32 is represented in the frequency domain each frequency sub-band 34 may contain one or more frequency components. Each frequency component may herein be e.g. an energy level of the frequency span represented by the frequency component. In the frequency domain the audio frame 32 may thus be a spectrum wherein the energy level describes how the power of the audio signal is distributed over the frequency components of the different frequency sub-bands 34. The energy level value may herein be normalized with respect to the frequency span of the frequency component such that it becomes independent of the spectral resolution.

Each successive audio frame 32 is furthermore classified S106 in each frequency sub-band 34 as either background or foreground using a background model specific to the frequency sub-band 34, as will be described below.

Each successive audio frame 32 of the audio signal is furthermore encoded S108, wherein a number of bits is allocated for each frequency sub-band 34 of the audio frame 32, wherein the number of bits allocated for a frequency sub-band 34 is higher if the audio frame 32 is classified as foreground in the frequency sub-band 34 than if the audio frame 32 is classified as background in the frequency sub-band 34. The encoding S108 will be described further below.

The steps of representing S104, classifying S106, and encoding S108 may be performed sequentially for each audio frame 32. However, all steps may not necessarily be finalized for one audio frame 32 before moving on to the next audio frame 32. For example, representing S104, and classifying S106, may be performed sequentially for each audio frame 32 and once a number of frames have been classified and buffered the buffered audio frames 32 may be encoded S108.

The method 100 furthermore comprises the optional step of updating S110 the background model wherein for the background model is updated for a frequency sub-band 34 of the audio frame 32 based on the frequency content of the frequency sub-band 34 of the audio frame 32.

The method 100 furthermore comprises the optional step of transmitting S112 the encoded audio frames 32 of the audio signal 30 together with metadata, wherein the metadata represents the classification 36 of the frequency sub-bands 34 of the audio frames 32.

Figure 4:
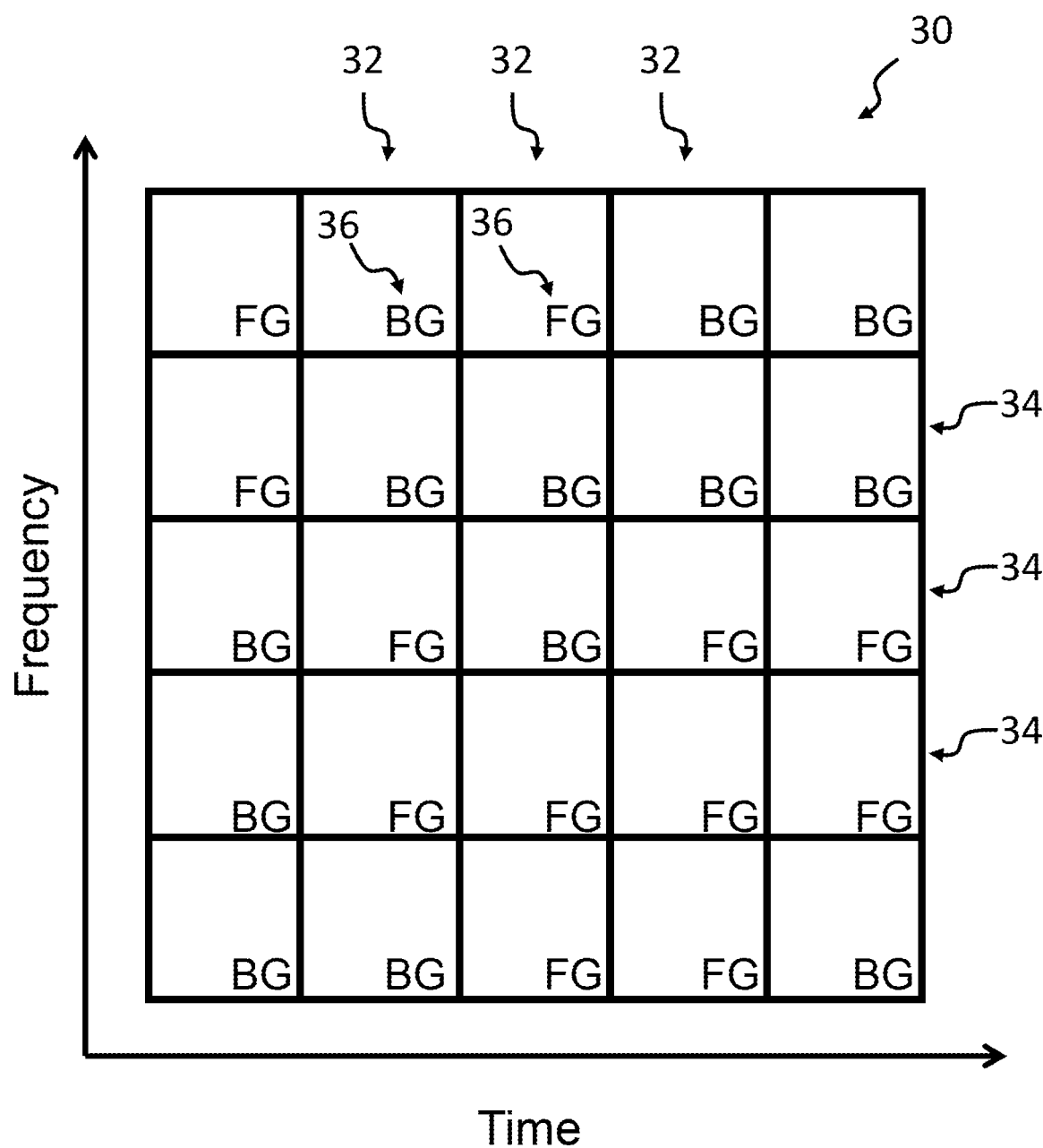
FIG. 4 is an audio signal represented in the frequency domain and classified.

FIG. 4 schematically illustrates an example of an audio signal 30 once it has been represented S104 in the frequency domain and classified S106. The audio signal 30 may herein be seen as a being divided into a number of audio frames 32 in the time domain and divided into a number of frequency sub-bands 34 in the frequency domain. Each frequency sub-band 34 of each audio frame 32 has a classification 36 which is used to determine the number of bits to be allocated for the frequency sub-band 34 in the encoding S108 step. In this figure and in the following figures a foreground classification is marked FG and a background classification is marked BG.

Figure 5:
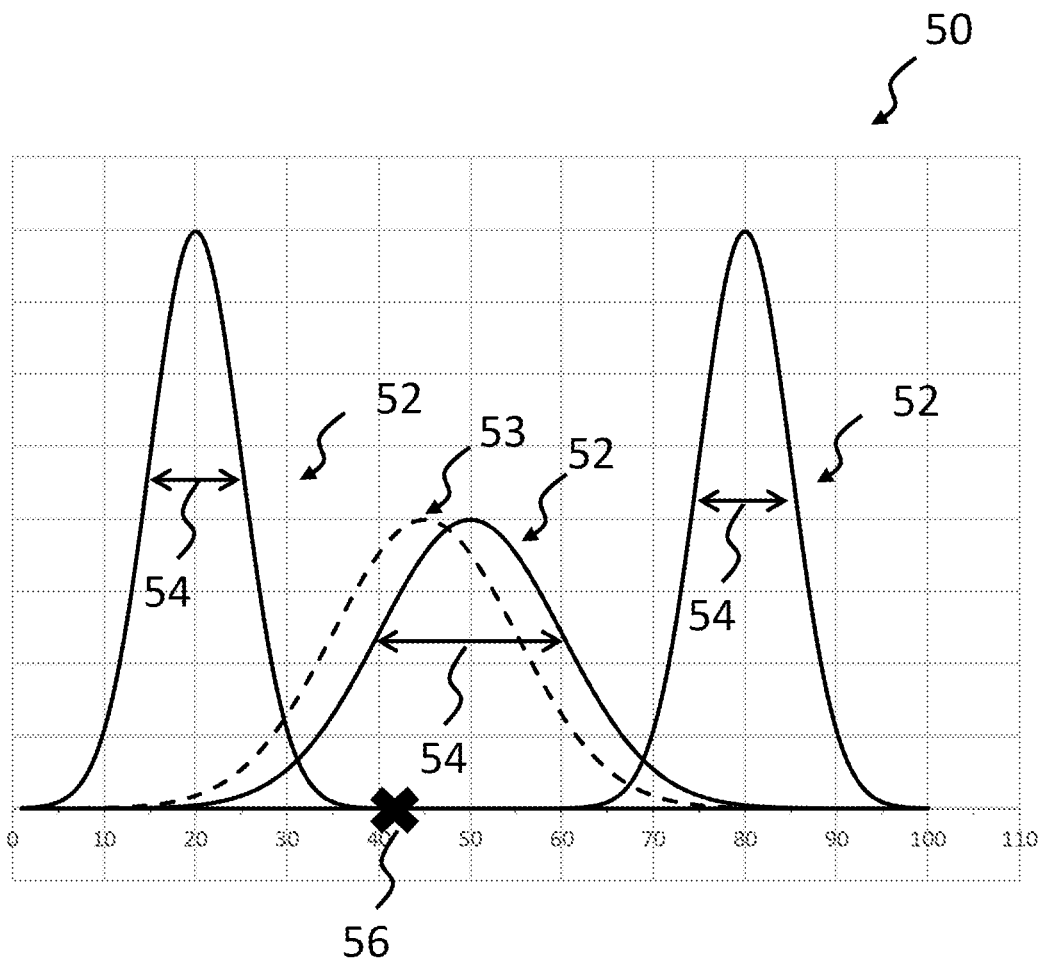
FIG. 5 is a Gaussian mixture model.

Hereinafter the step of classifying S106 the frequency sub-band 34 of an audio frame 32 will be described in further detail. FIG. 5 shows a GMM 50 which is used in some embodiment as a background model specific to a frequency sub-band 34. The concept of determining a background model for an audio frame using GMMs is further described in "On-line Audio Background Determination for Complex Audio Environments" [ACM Transactions on Multimedia Computing Communications and Applications•May 2007] Moncrieff et al. which describes a method for foreground/background separation of audio using a background modelling technique.

The GMM 50 depicted comprises three Gaussian distributions 52, each of which representing a probability distribution for energy levels in the frequency sub-band. Each frequency sub-band 34 may herein have its own Gaussian distributions 52 which models how sounds within that frequency sub-band 34 should be classified. Each Gaussian distribution 52 in the figure has a mean and a standard deviation. A predefined number of standard deviations 54 around the mean herein defines a range of energy levels of each Gaussian distribution 52. In some embodiments each Gaussian distribution 52 is furthermore associated with a weight which represents a probability that an energy level of the frequency sub-band 34 of the audio frame 32 will be within the predetermined number of standard deviations 54 around the mean of said Gaussian distribution 52. The weights of the Gaussian distributions may or may not be normalized.

In some embodiments a frequency sub-band 34 of an audio frame 32 is classified as background if two conditions are met. The first condition being that a measured energy level 56 of the frequency sub-band 34 falls within the ranges of energy levels, defined by the predefined number of standard deviations 54, of one of the Gaussian distributions 52. In FIG. 4 a measured energy level 56 of the frequency sub-band 34 falls within a predefined number of standard deviations 54 around the mean of the middle Gaussian distribution 52. The second condition being that said Gaussian distribution 52 has a weight above a threshold. In some embodiments, a measured energy level 56 of the frequency sub-band 34 may fall within the ranges of energy levels, defined by the predefined number of standard deviations 54, of more than one of the Gaussian distributions 54. In these cases, the frequency sub-band 34 may receive the classification corresponding to the Gaussian distribution 52 with the highest weight. If the highest weight is above the threshold weight, the frequency sub-band 34 will be classified as background.

In some embodiments the background model is updated based on the frequency content of the frequency sub-band 34 of the audio frame 32. For example, the GMM 50 of FIG. 5 can in some embodiments be updated after it has been used on a frequency sub-band 34 of an audio frame 32. An updated Gaussian distribution 53 may thus be formed based on the Gaussian distribution 52 and the measured energy level 56. FIG. 5 illustrates an updated Gaussian distribution 53 which will be used for a subsequent audio frame instead of the middle Gaussian distribution 52.

In the following a non-exhaustive list of examples of updates will be described. If the measured energy level 56 matches a Gaussian distribution 52, i.e. falls within the predefined number of standard deviations 54 around the mean of the Gaussian distribution 52 the matched Gaussian distribution 52 may be updated. For example, the mean and/or standard deviation of the matched Gaussian distribution 52 may be adjusted, the mean may be e.g. decreased if the measured energy level 56 was below the mean of the matched Gaussian distribution 52. The weight of the matched Gaussian distribution 52 may also be adjusted. The weight of the matched Gaussian distribution 52 may increase. The weight of Gaussian distributions 52 which did not match the measured energy level 56 may decrease. If the measured energy level 56 did not match any Gaussian distribution 52 the Gaussian distribution 52 with the lowest weight may be replaced with a new Gaussian distribution 52 having a mean which equals the measured energy level 56, a predefined standard deviation, and a predefined (low) weight. It should be understood that the weight of the matched Gaussian distribution 52 may also be taken into account when the update is made. It should also be understood that several Gaussian distributions 52 may match one measured energy level 56. Several Gaussian distributions 52 may also be adjusted in one single update of the background model.

Hereinafter the step of encoding S108 an audio frame 32 will be described in further detail. The encoding S108 of the audio frame 32 may be performed using an audio codec which support allocating different bit numbers for different frequency sub-bands 34. Such an audio codec is e.g. the Opus audio codec. Other codecs such as MP3 codecs, MPEG codecs or other codecs supporting VBR may be employed. When the audio frame 32 is encoded S108 the number of bits allocated for a frequency sub-band 34 of the audio frame 32 is higher if the audio frame 32 is classified as foreground in the frequency sub-band 34 than if the audio frame 32 is classified as background in the frequency sub-band 34.

Figure 6:
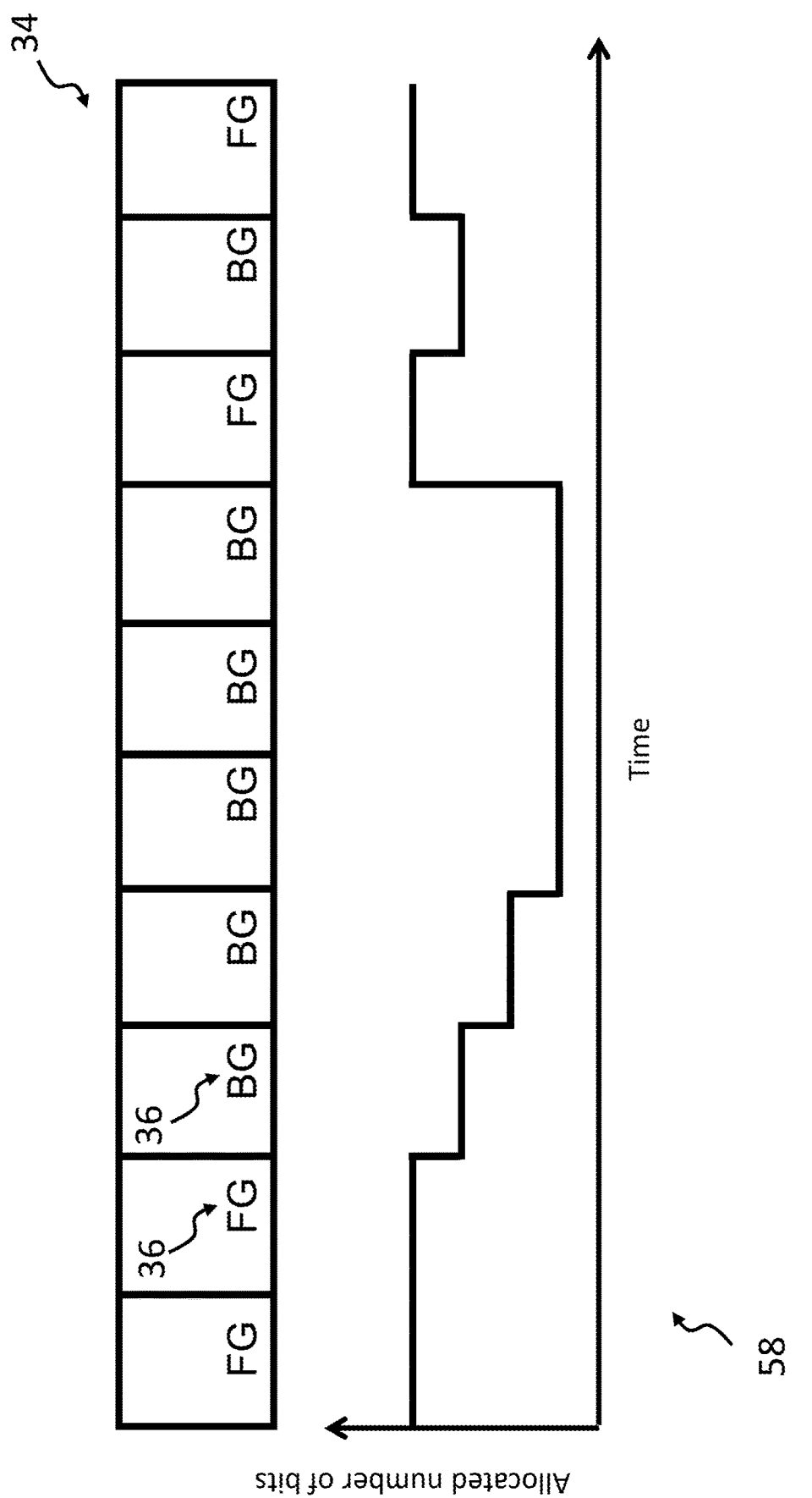
FIG. 6 is a schematic illustration of a gradual bitrate decline compression.

The allocated number of bits may be dependent on both the classification of the current audio frame 32 and the classification of the preceding audio frame 32, e.g. in a gradual bitrate decline compression 58. FIG. 6 schematically illustrates a gradual bitrate decline compression 58 for a frequency sub-band 34. The figure illustrates the allocated number of bits as a function of time when the allocated number of bits depend on the classification 36 of the preceding audio frame 32. In the illustrated situation a switch from a foreground classification to a background classification results in the allocated bit number being reduced gradually rather than instantaneously. After a switch from a foreground classification to a background classification the allocated bit number is reduced for each subsequent background classification of the audio frames 32 in the frequency sub-band 34 until a preset low value is reached. A switch from a background classification to a foreground classification may in contrast results in the allocated bit number being increased to a high value instantaneously.

The allocated number of bits may also be independent of the classification of the preceding audio frame 32. The allocated number of bits may e.g. be set to a high value for each frequency sub-band 34 of an audio frame 32 which is classified as foreground. The allocated number of bits may e.g. be set to a low value for each frequency sub-band 34 of an audio frame 32 which is classified as background.

In some embodiments what constitutes the low and high values is the same in all frequency sub-bands. In some embodiments what constitutes the low and high values is different from one frequency sub-band to another. The number of bits allocated for encoding a background classified frequency sub-band 34 of the audio frame 32 may e.g. be dependent on a frequency range of the background classified frequency sub-band 34 of the audio frame 32. The number of bits allocated for encoding a foreground classified frequency sub-band 34 of the audio frame 32 may e.g. be dependent on a frequency range of the foreground classified frequency sub-band 34 of the audio frame 32. The number of bits allocated for encoding a foreground or background classified frequency sub-band 34 may also depend on a psychoacoustic model.

Once the audio frames 32 have been encoded they may be transmitted, e.g. transmitted by the encoder 10. The audio frames 32 may e.g. be transmitted in a network, either over a wired connection or wirelessly. The classification of the frequency sub-bands 34 of the audio frames 32 may herein be transmitted as metadata together with the encoded audio frames.

In the above, the described concept has mainly been set forth with reference to a limited number of examples. However, as is readily appreciated by a person skilled in the art, other examples than the ones disclosed above are equally possible within the scope of the inventive concept, as defined by the appended claims.

The invention claimed is:

1. A method for encoding an audio signal with variable bitrate, the method comprising:
receiving an audio signal to be encoded, the audio signal comprising a plurality of successive audio frames;
for each successive audio frame of the audio signal:
representing the audio frame in a frequency domain with respect to a plurality of frequency sub-bands; and
classifying each frequency sub-band of the audio frame as either background or foreground using a background model specific to each frequency sub-band of the plurality of frequency sub-bands; and
encoding each successive audio frame of the audio signal, wherein a number of bits is allocated for each frequency sub-band of the audio frame, wherein the number of bits allocated for a frequency sub-band is higher if the audio frame is classified as foreground in the frequency sub-band than if the audio frame is classified as background in the frequency sub-band.

2. The method of claim 1, wherein the number of bits allocated for encoding a background classified frequency sub-band of the audio frame is dependent on a frequency range of the background classified frequency sub-band of the audio frame; and/or the number of bits allocated for encoding a foreground classified frequency sub-band of the audio frame is dependent on a frequency range of the foreground classified frequency sub-band of the audio frame.

3. The method of claim 2, wherein the number of bits allocated for encoding a frequency sub-band of the audio frame is dependent on the frequency range of the frequency sub-band of the audio frame according to a psychoacoustic model.

4. The method of claim 1, wherein the audio signal is encoded such that the number of bits allocated to a background classified first frequency sub-band of a first audio frame is higher if the same first frequency sub-band in an audio frame preceding the first audio frame was classified as foreground compared to if the same first frequency sub-band in the audio frame preceding the first audio frame was classified as background.

5. The method of claim 1, wherein the number of bits allocated for encoding a frequency sub-band of the audio frame further depends on a psychoacoustic model.

6. The method of claim 1, wherein the number of bits allocated for encoding a background classified frequency sub-band of the audio frame is independent of a frequency range that the background classified frequency sub-band of the audio frame represents and wherein the number of bits allocated for encoding a foreground classified frequency sub-band of the audio frame is independent of a frequency range that the foreground classified frequency sub-band of the audio frame belongs to.

7. The method of claim 1, the method further comprising: for an audio frame of the audio signal: for a frequency sub-band of the audio frame; updating the background model specific to the frequency sub-band which corresponds to the frequency sub-band of the audio frame based on a frequency content of the frequency sub-band of the audio frame.

8. The method of claim 1, wherein the background model specific to the frequency sub-band includes a Gaussian Mixture Model, GMM, the GMM comprising a plurality of Gaussian distributions, each of which representing a probability distribution for energy levels in the frequency sub-band.

9. The method of claim 8, wherein a frequency sub-band of the audio frame is classified as background if an energy level of the frequency sub-band of the audio frame lies within a predetermined number of standard deviations around a mean of one of the Gaussian distributions of the GMM of the background model specific to the frequency sub-band, and if a weight of said Gaussian distribution is above a threshold, wherein the weight represents a probability that an energy level of the frequency sub-band of the audio frame will be within the predetermined number of standard deviations around the mean of said Gaussian distribution.

10. The method of claim 8, wherein the energy level is a power spectral density, PSD, measurement.

11. The method of claim 1, wherein the method further comprises: transmitting the encoded audio frames of the audio signal together with metadata, wherein the metadata indicates the classification of the frequency sub-bands of the audio frames.

12. A computer program product comprising a non-transitory computer readable medium storing computer-readable instructions which, when executed on a processor, will cause the processor to perform the method according to claim 1.

13. The computer program product of claim 12, wherein the background or foreground classification is related to a sound contained in the frequency sub-band of the audio frame.

14. The method of claim 1, wherein the background or foreground classification is related to a sound contained in the frequency sub-band of the audio frame.

15. The method of claim 14, wherein the background or foreground classification is determined based on a frequency of the sound in the frequency sub-band in a previous audio frame.

16. An encoder for encoding an audio signal with variable bitrate, the encoder comprising:
a receiver and one or more processors,
wherein the receiver is configured to receive an audio signal to be encoded, the audio signal comprising a plurality of successive audio frames, and;
wherein the one or more processors are configured to:
for each successive audio frame of the audio signal:
represent the audio frame in a frequency domain with respect to a plurality of frequency sub-bands; and
classify each frequency sub-band of the audio frame as either background or foreground using a background model specific to each frequency sub-band of the plurality of frequency sub-bands; and
encode each successive audio frame of the audio signal, wherein a number of bits is allocated for each frequency sub-band of the audio frame, wherein the number of bits allocated for a frequency sub-band is higher if the audio frame is classified as foreground in the frequency sub-band than if the audio frame is classified as background in the frequency sub-band.

17. The encoder of claim 16, wherein the background or foreground classification is related to a sound contained in the frequency sub-band of the audio frame.

18. The encoder of claim 17, wherein the background or foreground classification is determined based on a frequency of the sound in the frequency sub-band in a previous audio frame.

19. A monitoring device comprising:
a microphone configured to record an audio signal;
an encoder configured to receive the audio signal from the microphone and encode the audio signal with variable bitrate, the encoder for encoding an audio signal with variable bitrate, the encoder comprising a receiver and one or more processors,
wherein the receiver is configured to receive an audio signal to be encoded, the audio signal comprising a plurality of successive audio frames, and;
wherein the one or more processors are configured to:
for each successive audio frame of the audio signal:
represent the audio frame in a frequency domain with respect to a plurality of frequency sub-bands; and
classify each frequency sub-band of the audio frame as either background or foreground using a background model specific to each the frequency sub-band of the plurality of frequency sub-bands; and
encode each successive audio frame of the audio signal, wherein a number of bits is allocated for each frequency sub-band of the audio frame, wherein the number of bits allocated for a frequency sub-band is higher if the audio frame is classified as foreground in the frequency sub-band than if the audio frame is classified as background in the frequency sub-band.

20. The monitoring device of claim 19, wherein the background or foreground classification is related to sound contained in the frequency sub-band of the audio frame.

* * * * *